US006938145B2

(12) United States Patent
Noyes et al.

(10) Patent No.: US 6,938,145 B2
(45) Date of Patent: *Aug. 30, 2005

(54) ASSOCIATIVE MEMORY SYSTEM WITH A MULTI-DIGIT INCREMENTABLE VALIDITY COUNTER

(75) Inventors: Bruce A. Noyes, Phoenix, AZ (US); Russell W. Guenthner, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 405 days.

This patent is subject to a terminal disclaimer.

(21) Appl. No.: 10/309,459

(22) Filed: Dec. 4, 2002

(65) Prior Publication Data

US 2004/0111585 A1 Jun. 10, 2004

(51) Int. Cl.⁷ .............................................. G06F 12/00
(52) U.S. Cl. .......................... 711/206; 711/6; 711/209; 711/221
(58) Field of Search ................................ 711/206, 209, 711/221, 6

(56) References Cited

U.S. PATENT DOCUMENTS 5,282,274 A * 1/1994 Liu ............................. 711/206
5,628,023 A * 5/1997 Bryant et al. ............... 711/207

* cited by examiner

Primary Examiner—Reba I. Elmore
(74) Attorney, Agent, or Firm—James H. Phillips (57) ABSTRACT

A computer system includes a central processing unit, an addressable main memory storing data pages and a page table, and an associative memory. The associative memory stores a plurality of entries in accordance with a low order virtual address component issued by the CPU's processor when access to a given page in main memory is sought. Each entry in the associative memory includes fields respectively holding: 1) a high order virtual address component; 2) a real page address; and 3) a multi-digit validity count. An incrementable multi-digit counter in the CPU stores a current validity count. When access to a data page is sought, a comparator receives: 1) the high order virtual address component of the data page; 2) the high order virtual address component read from the associative memory entry; 3) the multi-digit validity count read from the associative memory entry; and 4) the multi-digit current validity count in the counter. If there is a full match, a switch issues the real page address read from the associative memory entry. If there is not a match, the page table is consulted to obtain the real address of the requested page, and the associative memory is updated accordingly.

26 Claims, 6 Drawing Sheets

ASSOCIATIVE MEMORY SYSTEM WITH A MULTI-DIGIT INCREMENTABLE VALIDITY COUNTER

CROSS-REFERENCE TO RELATED APPLICATION

Reference may be taken to related co-pending U.S. Pat. application Ser. No. 10/309,460 entitled AN EMUMLATED TARGET ASSOCIATIVE MEMORY SYSTEM WITH A MULTI-DIGIT INCREMENTABLE VALIDITY COUNTER by Bruce A. Noyes, filed on even date herewith and assigned to the same Assignee.

FIELD OF THE INVENTION

This invention relates to the art of computer memories and, more particularly, to an associative memory.

BACKGROUND OF THE INVENTION

A modern computer system with a large memory (called "main memory" herein) may use virtual addressing in which a virtual memory address issued by a processor must be converted to a real (physical) address in the main memory to read or write the addressed storage area. A conversion table, often called a page table, holds the virtual-to-real cross reference information. However, the page table is usually stored in the main memory itself such that accessing the page table to effect a virtual-to-real conversion for each memory access would be very time consuming. Associative memories have been used for many years to speed up this process.

Associative memories are small, fast memories, directly available to the processor, which store an updateable selection of entries in the page table. The entries are updated when there is a "miss" (the associative memory does not hold the particular virtual-to-real entry requested by the processor) such that the page table must be consulted directly to obtain the requested virtual-to-real address conversion information. However, this particular entry can be sent to the associative memory as a result of the page table access so that the next request for the same virtual-to-real address conversion can be serviced very quickly.

It is sometimes necessary to clear an entire associative memory by marking all entries "invalid". Embodiments of the invention serve to perform this function very efficiently.

DETAILED DESCRIPTION

Figure 1:
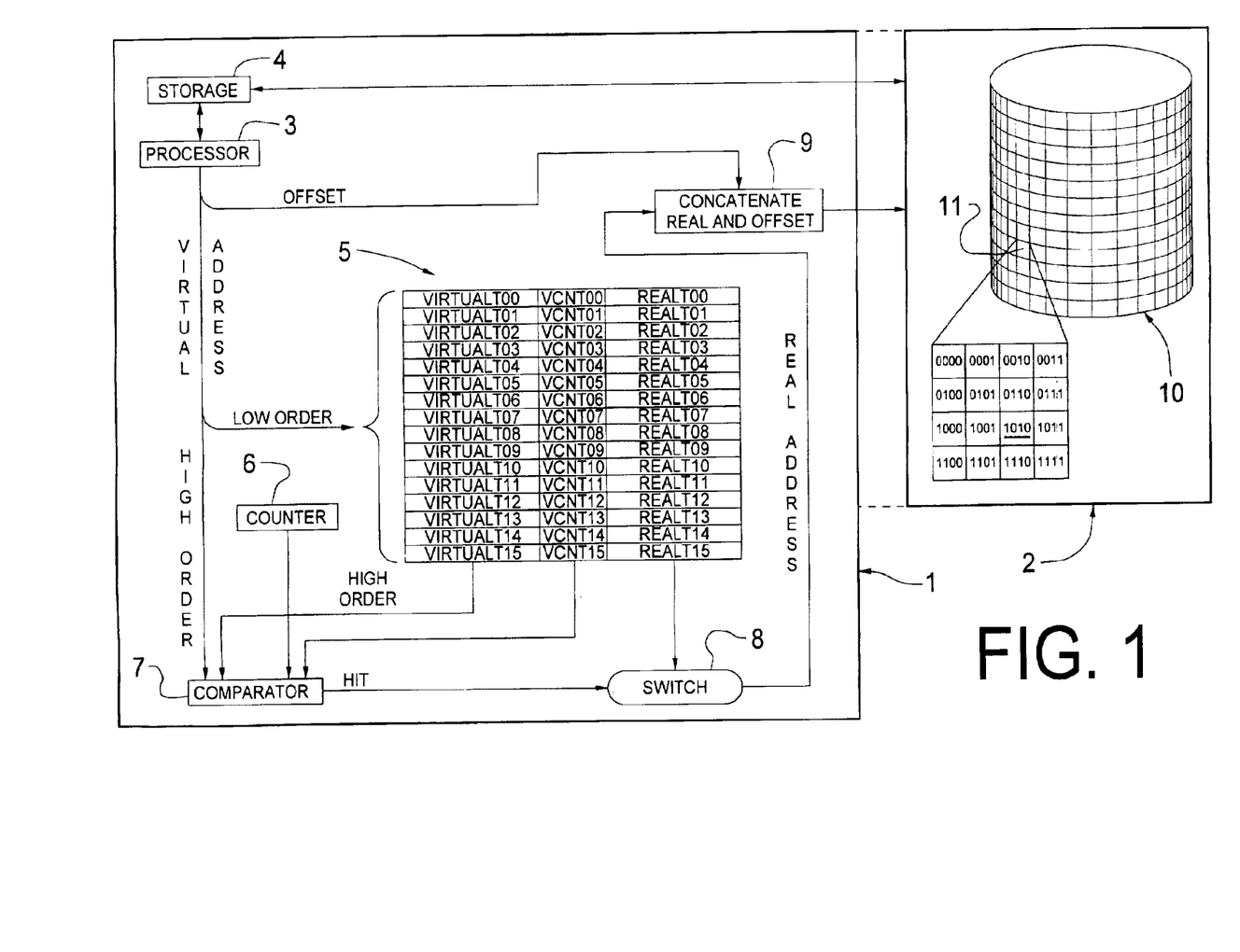
FIG. 1 is a partially block, partially schematic diagram of a computer system incorporating an embodiment of the invention and illustrating operation when there is an associative memory "hit"

Attention is first directed to FIG. 1 which shows an embodiment of the invention in a computer system which includes a central processing unit (CPU) 1 which includes a processor 3, a storage 4 (local cache and/or other local fast memory) and an associative memory 5. (In some architectures, part or all the storage 4 may be integrated with the processor 3.) The CPU 1 is coupled to an addressable large ("main") memory 2 having a mass storage device 10. The associative memory 5 has support circuitry including a counter 6, a comparator 7, a switch 8 and a concatenate block 9.

The associative memory 5 stores a table of entries each of which includes a virtual address field "VirtualTXX", a corresponding real page address field "RealTXX" and also a multi-digit count in a validity field "VcntXX".

In the example chosen to illustrate the embodiment of the invention shown in FIG. 1, a small associative memory 5 is shown, and relatively small address fields are used. It will be fully understood by those skilled in the art that larger associative memories and address fields are commonly used. If a very small 16-bit complete address field is assumed, the example shown uses an offset (lowest order) value, which identifies the position of an addressed block in a page stored in memory, of from 0000 to 1111 as shown at 12 in FIG. 1. The lowest orders of the virtual/real addresses stored in the associative memory 5 are a function of their individual positions in the table and thus also range from 0000 ("00") to 1111 ("15"). Thus, in the example, the high order virtual and real addresses, stored respectively in the "VirtualTXX" and "RealTXX" fields in the table, each range from 00000000 to 11111111. The validity counter field "VcntXX" can also be any length suitable for a given system, but in the example is assumed to be four bits long such that the range of storage in the validity counter field ranges from 0000 to 1111. Thus, the length of each full entry in the exemplary associative memory is twenty bits. The order of the columns in the table is not critical and the order shown has been chosen only for purposes of illustration.

During normal operation, the processor 3 may issue a virtual address corresponding to, for example, page 11 in the mass storage device 10 and also an offset value of 1010 identifying the particular block in the mass storage device to be read from or written to. The low order component of the virtual address, say 1001, is used to conventionally address the high order virtual address information stored in the VirtualT09 position, which high order virtual address information is sent to the comparator 7 for comparison with the high order virtual address issued by the processor 3. In addition, the Vcnt09 multi-digit validity value is sent to the comparator 7 for comparison with the current count in the counter 6.

Assuming that the high order virtual addresses compare and also that the multi-digit validity value matches the current count in the counter 6, the comparator 7 sends an enable ("hit") signal to switch 8 which responsively effects copy of real address RealT09 to the concatenate block 9 which also receives the offset value, 1010 in the example, from the processor 3. The concatenated full address is sent to the main memory 2 to set up communication between block 1010 of page 1010 and the storage 4 in the CPU 1 to carry out whatever read/write from/to operation is required by the processor 3. (Some systems only require the read/write of full pages from/to main memory 2 and thus need no provision for concatenating an offset value such that the real address output from the switch 8 is the full address sent to the main memory.)

Figure 2:
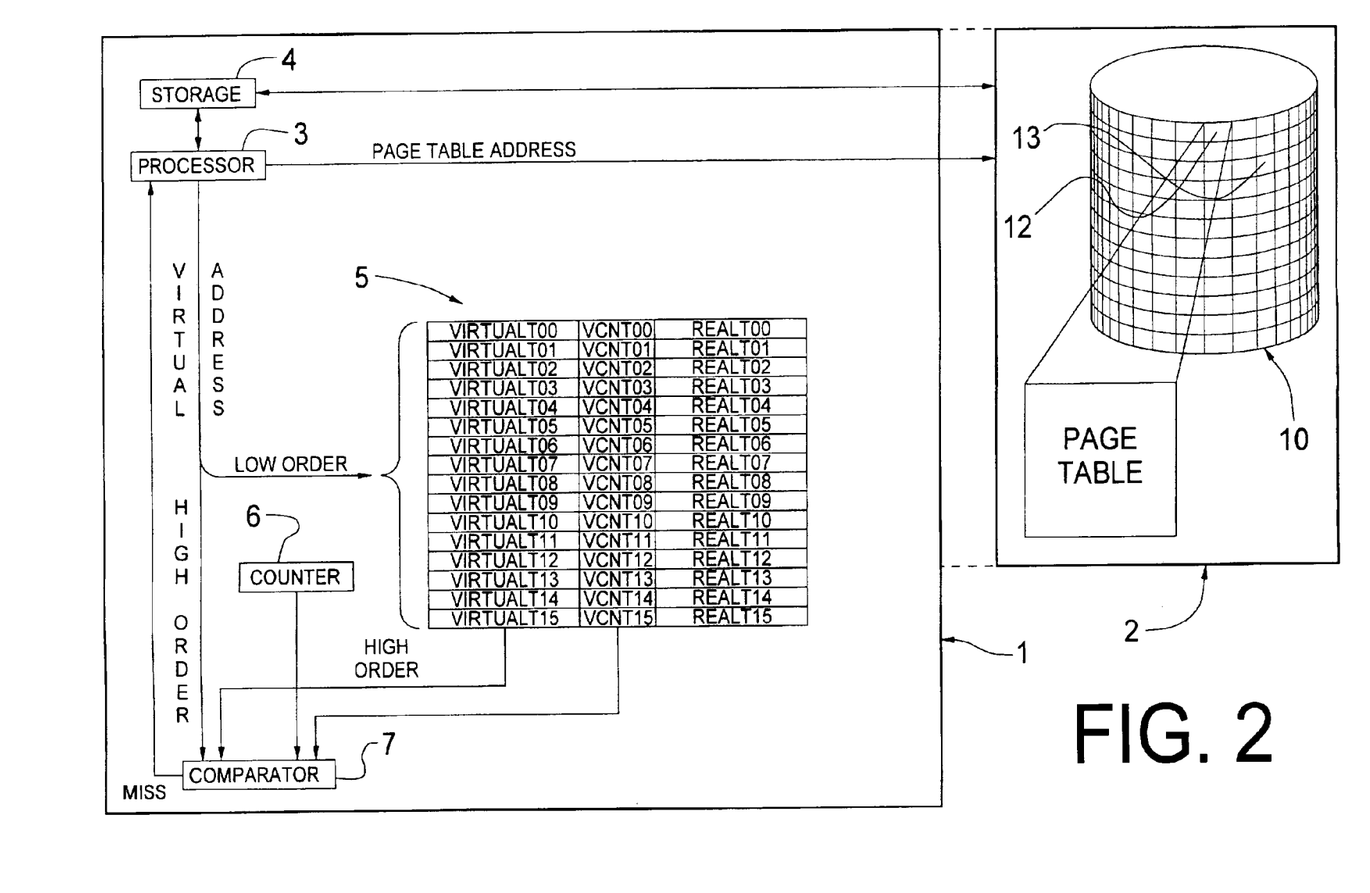
FIG. 2 is a view of the computer system of FIG. 1 illustrating a first operation, accessing the page table, when there is an associative memory "miss"

Referring now to FIG. 2, consider the operation of the system when the processor 3 issues the virtual address for page 13 in the mass storage device 10 and there is a miss in the comparator 7 due to a mismatch between the virtual high order address specified by the processor 3 and the virtual high order address stored in the specified virtual low order address position, say VirtualT04, in the associative memory 5. The comparator 7 sends a miss signal to the processor 3 which knows that it must consult the page table 12 directly in order to obtain the virtual-to-real conversion information for accessing page 13 and thus issues the page table address to obtain this information.

Similarly, consider the operation when the processor 3 issues the virtual address for page 13 in the mass storage device 10 and there is a miss in the comparator 7 due to a mismatch between the current value stored in the counter 6 and the count stored in the validity count field, say Vcnt04, in the associative memory 5. (This means that the entry is "invalid" even if the high order virtual address is a match; page 13 may not be at the real address specified by RealT04.) The comparator 7 will send the "miss" signal to the processor 3 which will consult the page table 12 directly in order to obtain the current virtual-to-real conversion information for accessing page 13.

Figure 3:
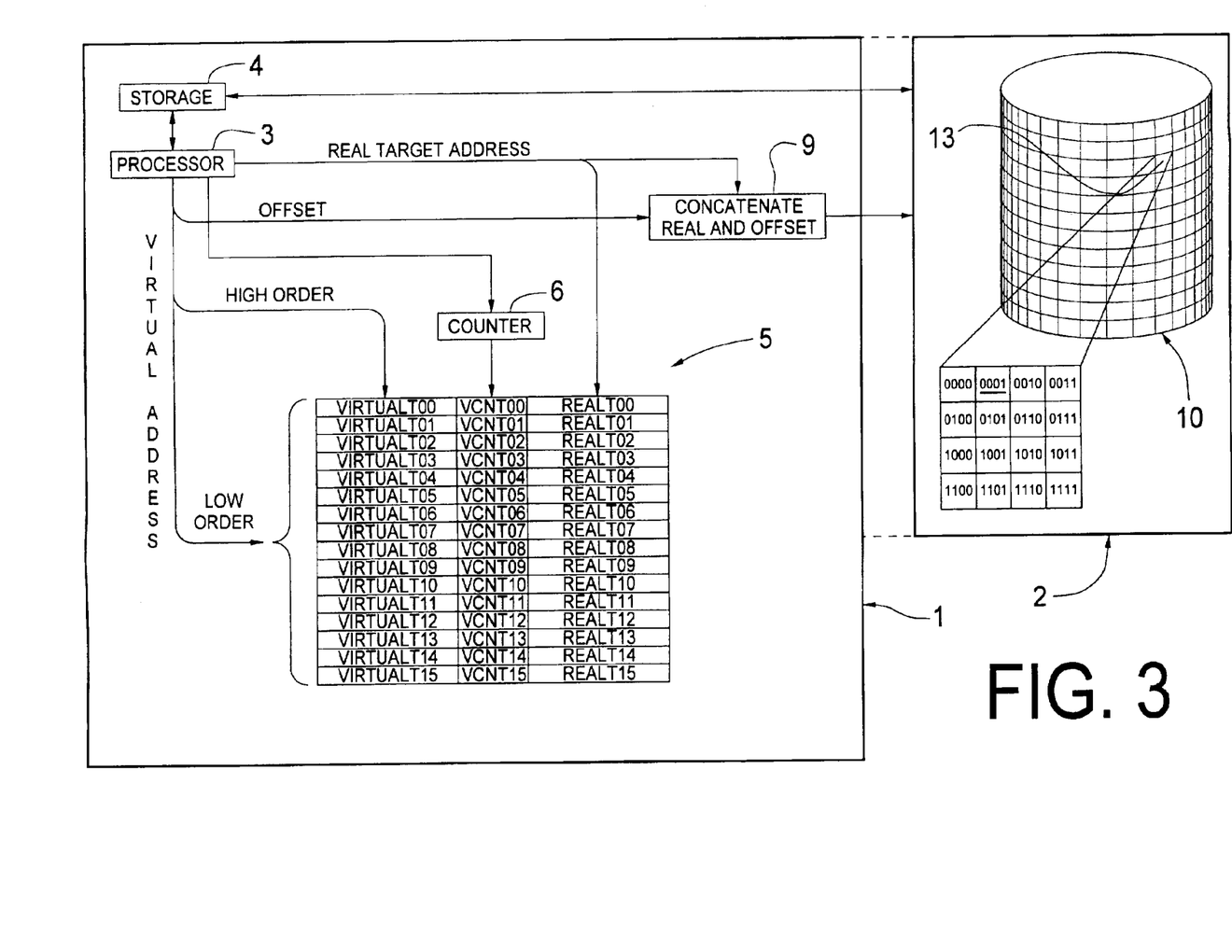
FIG. 3 is a view of the computer system of FIG. 1 illustrating a second operation, updating the associative memory, when there is an associative memory "miss"

Referring to FIG. 3, following either of these "miss" conditions, the processor has obtained the real address for the page 13 from the page table 12 and sends it to the concatenate block 9 along with the offset, say 0001, in order to establish communications between the storage 4 and block 0001 of page 13 in mass storage device 10 to carry out whatever read/write from/to operation is required by the processor 3.

In addition, the associative memory 5 is updated with the virtual-to-real translation information for page 13 in the mass storage device 10 so that page 13 can next be accessed much more quickly. The processor sends the high order virtual address information and the real address information for storage as VirtualT04/RealT04 as defined by the low order address information and also enters the current count in counter 6 into the multi-digit validity field Vcnt04 in order to mark this updated entry as "valid".

Figure 4:
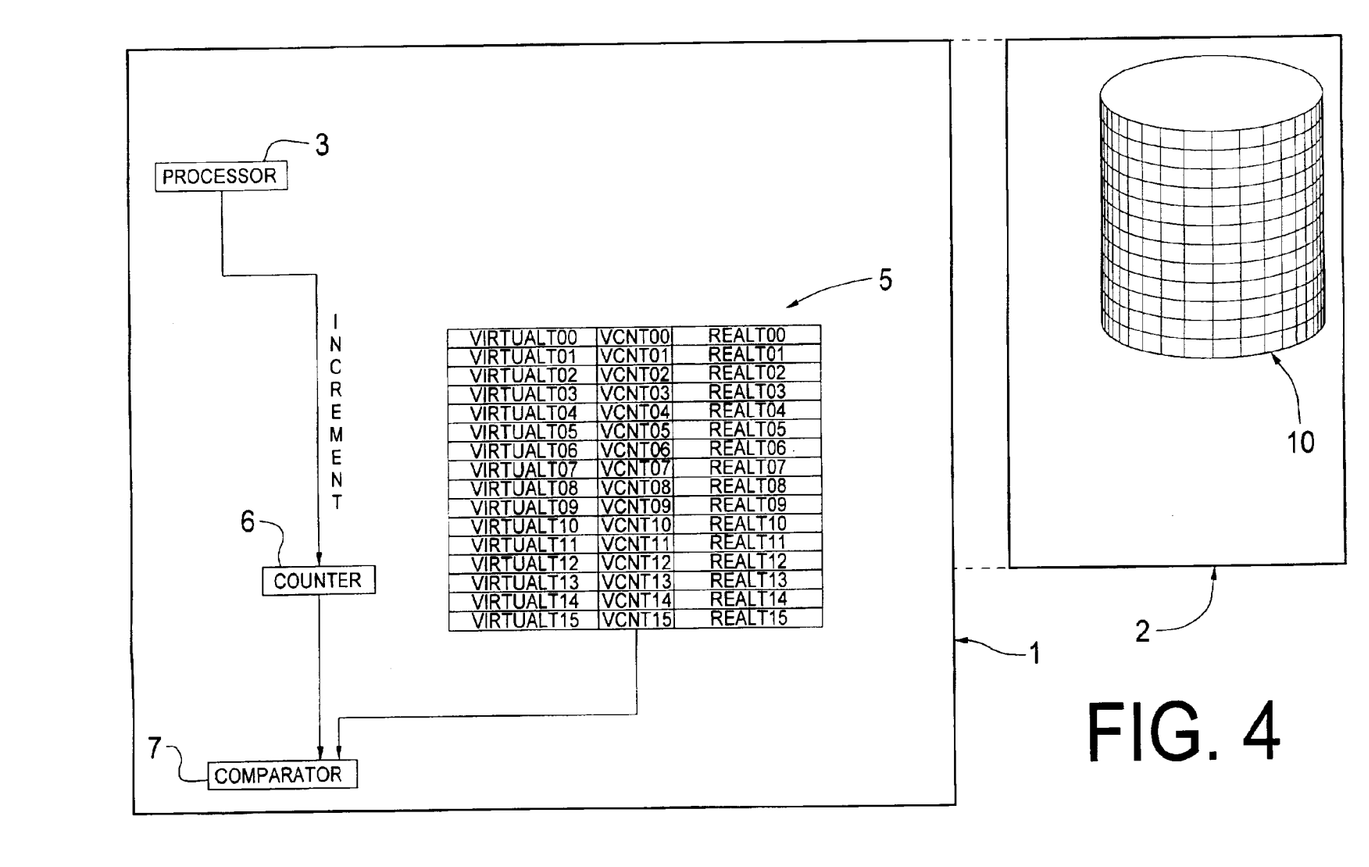
FIG. 4 is a view of the computer system of FIG. 1 illustrating an operation to "invalidate" the entire associative memory simultaneously.

It is sometimes necessary to mark all entries in an associative memory invalid. Attention is now directed to FIG. 4 which shows how this operation is performed very efficiently in the illustrated embodiment of the invention. The processor send an "increment" signal to the counter 6 to advance the count in the counter by one binary digit. (Alternatively, a negative increment or "decrement" may be employed to decrease the count in the counter 6 by one binary digit. Thus, in the claims appended hereto, the term "increment" comprehends both positive and negative increment.) It will be appreciated that this simple step immediately invalidates all entries in the associative memory 5 because succeeding accesses on each low order address will "miss" on the validity count compare until that entry has been updated as shown in FIG. 3 and discussed above.

Figure 5:
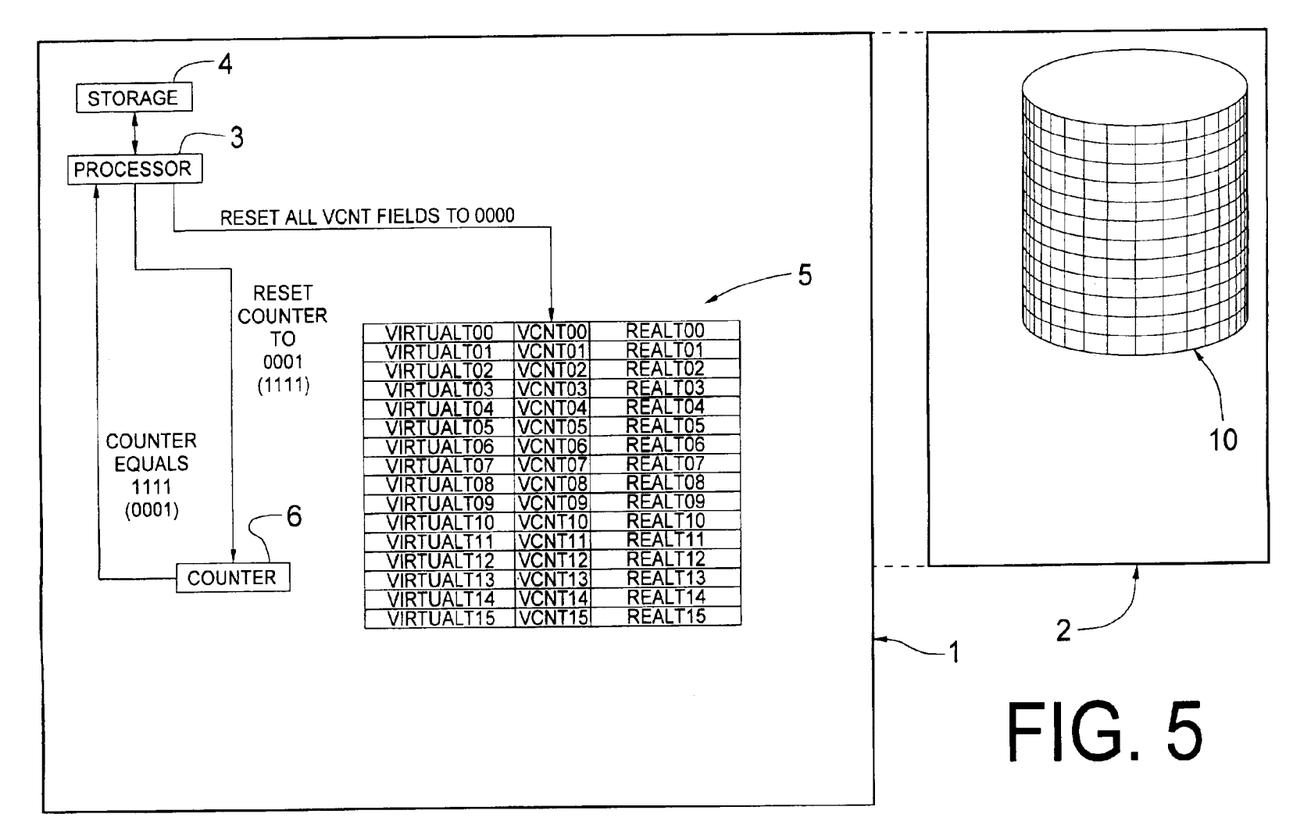
FIG. 5 is a view of the computer system of FIG. 1 illustrating an operation for directly resetting all validity count fields in the associative memory to a base count and also a related operation to reset the counter to a count offset from the base count.

However, this procedure must take into account that the counter 6 will eventually "roll over" and again begin to count through the same sequence. Thus, without intervention, it is possible that old entries still resident in the associative memory 5 would inadvertently be marked "valid" when the counter 6 reaches the count(s) stored in one or more of the VcntXX fields. This contingency is treated as shown in FIG. 5.

A exemplary four-digit length is assumed for counter 6 such that its value range is from 0000 to 1111. When incrementation is used to step the counter 6, it will eventually reach a count of 1111, and a corresponding signal is sent to the processor 3. The processor 3 responds by setting all VcntXX fields in the associative memory 5 to 0000 and setting the count in the counter 6 to 0001. Similarly, when decrementation is used to step the counter 6, it will eventually reach a count of 0001, and a corresponding signal is sent to the processor 3. The processor 3 responds by setting all VcntXX fields in the associative memory 5 to 0000 and setting the count in the counter 6 to 1111. Of course, other base counts and increment values may be employed with suitable adjustment to the details of resetting the counter 6 and the validity count fields of all the entries in the associative memory 5.

Figure 6:
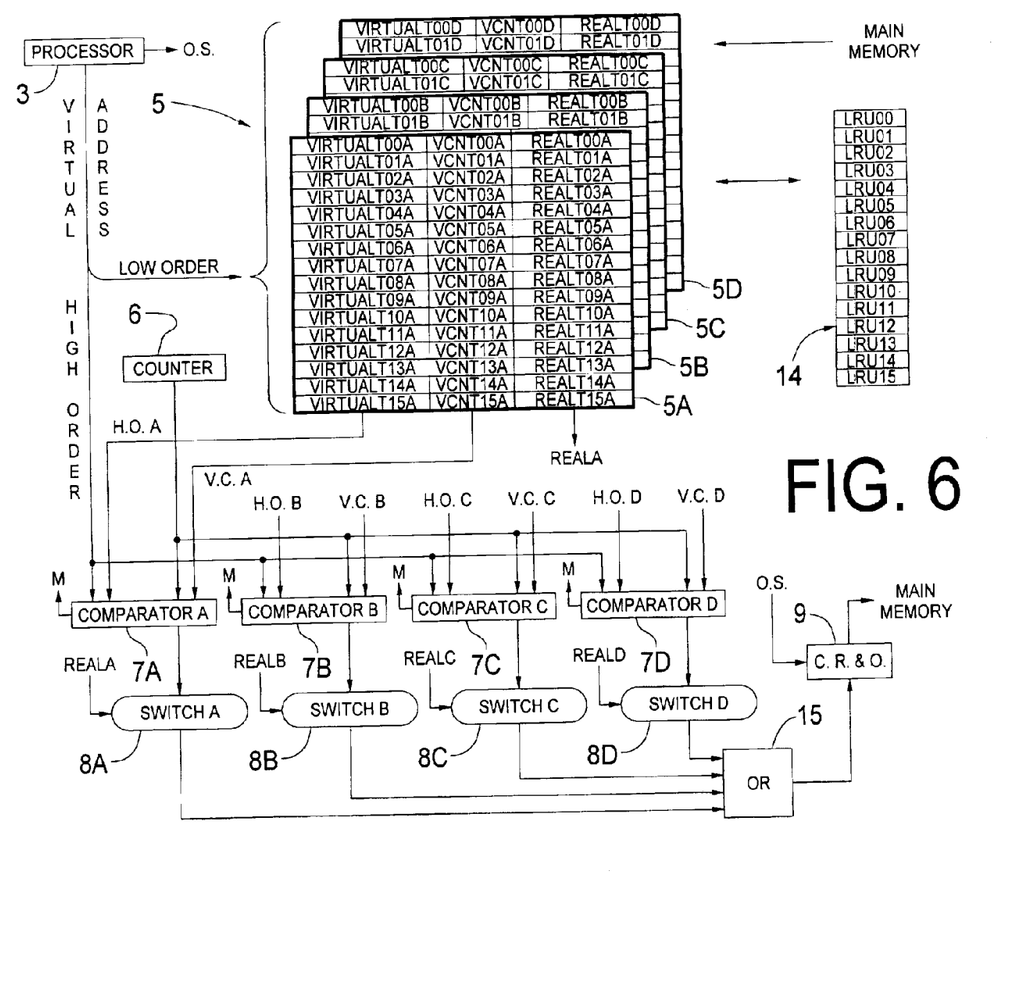
FIG. 6 is a view of an associative memory in an embodiment of the invention incorporating a plurality of levels of association.

In the embodiment of the invention shown in FIG. 6, a plurality of entries having the same low order address are stored in the associative memory 5 at respective levels of association in ranks 5A, 5B, 5C and 5D, four levels of association having been chosen as the example. Thus, when the processor 3 sends a low order address, say 1010, to the associative memory 5, four virtual high order addresses—VirtualT12A, VirtualT12B, VirtualT12C, VirtualT12D—and four validity count field entries—Vcnt12A, Vcnt12B, Vcnt12C, Vcnt12D—from banks 5A, 5B, 5C, 5D are asserted on respective comparators 7A, 7B, 7C, 7D for comparison against the virtual high order address issued by the processor 3 and the current count in the counter 6.

Each of the comparators' 7A, 7B, 7C, 7D outputs is coupled as a control signal to a respective switch 8A, 8B, 8C, 8D which, respectively receive the relevant real address entries ("REALA", "REALB", "REALC", "REALD") stored in the banks 5A, 5B, 5C, 5D. Thus, if there is a full match in any one of the comparators 7A, 7B, 7C, 7D, say comparator 7C, then the output of the comparator 7C is used to enable the switch 8C to send the corresponding real address in bank 5C, i.e., RealT12C, to one of the inputs to an OR-circuit 15. The OR-circuit 15 passes the validated real address to the concatenate block 9 where the offset value provided by the processor is appended to fully develop the address in main memory of the block to be accessed.

If there is a full miss (in the example, all comparators issue a miss signal "M"), then the page table 12 is consulted to obtain the virtual-to-real address conversion information as discussed above in reference to FIG. 2, and the relevant entry is updated in the associative memory 5 as discussed above in reference to FIG. 3. It is preferable to send the new associative memory entry having a given low order address to the least-recently-used invalid entry in the several banks, 5A, 5B, 5C, 5D in the exemplary embodiment shown in FIG. 6. This is achieved using a conventional LRU block 14 which has access to the associative memory 5 for tracking usage and updates and directs each new update into the appropriate bank 5A, 5B, 5C or 5D which replaces the least-recently-used invalid entry specified by the low order address of the requested page.

Those skilled in the art will recognize that modifications and variations can be made without departing from the spirit of the exemplary embodiments discussed above. Therefore, it is intended to encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps.

Further, in some or all the claims set forth below, an outline format is employed solely for the purpose of recitation clarity, and the outline level of any particular recited element or step should not be taken as necessarily indicative of the relative stature of that element or step in a given claim.

What is claimed is:

1. A computer system including a central processing unit (CPU) and an addressable main memory storing data pages, at least one data page storing a page table, said CPU comprising:
   A) a processor coupled to said main memory;
   B) an associative memory storing a plurality of entries, each entry in said associative memory being stored in accordance with a low order virtual address component issued by said processor, each entry in said associative memory including fields respectively holding:
      1) a high order virtual address component;
      2) a real page address; and
      3) a multi-digit validity count;
   C) a multi-digit counter storing a current validity count;
   D) a comparator coupled to receive:
      1) a high order virtual address component of a requested data page in said main memory from said processor when access to the requested page is desired during the ongoing activity of the CPU;
      said processor also sending a low order virtual address component of the requested data page to said associative memory to specify an entry therein;
      2) the high order virtual address component read from the specified associative memory entry;
      3) the multi-digit validity count read from the specified associative memory entry; and
      4) the multi-digit current validity count in the counter;
   E) a switch coupled to receive the real page address read from the specified associative memory entry and, when enabled, issue the real page address; and
   F) said comparator issuing a signal to enable said switch when:
      1) there is a match between the high order virtual address components received, respectively, from said processor and said associative memory; and
      2) there is a match between the multi-digit validity counts received, respectively, from said counter and said associative memory.

2. The computer system of claim 1 in which, if said comparator does not issue a signal to enable said switch, said comparator sends a miss signal to said processor and said processor responsively directs an access to said page table stored in said main memory to obtain the real page address of the requested data page identified by the high order virtual address component sent to said comparator by said processor and the low order virtual address component sent to said associative memory by said processor, thereby obtaining access to said requested data page.

3. The computer system of claim 2 in which the entry specified by the virtual low order address of the requested data page is updated by placing:
   A) the high order virtual address component for the requested data page, as obtained from the page table, into the high order virtual address component field;
   B) the real page address for the requested data page, as obtained from the page table, into the real page address field; and
   C) the current count in said multi-digit counter into the multi-digit validity count field.

4. The computer system of claim 1 in which all entries in said associative memory are simultaneously invalidated by incrementing said counter.

5. The computer system of claim 2 in which all entries in said associative memory are simultaneously invalidated by incrementing said counter.

6. The computer system of claim 3 in which all entries in said associative memory are simultaneously invalidated by incrementing said counter.

7. The computer system of claim 4 in which said counter is positively incremented to simultaneously invalidate all entries in said associative memory and in which, when the count in said counter reaches all "1"s:
   A) said counter is reset to a count of one; and
   B) all the multi-digit validity count fields in all entries in said associative memory are reset to a count of zero.

8. The computer system of claim 5 in which said counter is positively incremented to simultaneously invalidate all entries in said associative memory and in which, when the count in said counter reaches all "1"s:
   A) said counter is reset to a count of one; and
   B) all the multi-digit validity count fields in all entries in said associative memory are reset to a count of zero.

9. The computer system of claim 6 in which said counter is positively incremented to simultaneously invalidate all entries in said associative memory and in which, when the count in said counter reaches all "1"s:
   A) said counter is reset to a count of one; and
   B) all the multi-digit validity count fields in all entries in said associative memory are reset to a count of zero.

10. The computer system of claim 4 in which said counter is negatively incremented to simultaneously invalidate all entries in said associative memory and in which, when the count in said counter reaches a count of one:
   A) said counter is reset to all "1"s; and
   B) all the multi-digit validity count fields in all entries in said associative memory are reset to a count of zero.

11. The computer system of claim 5 in which said counter is negatively incremented to simultaneously invalidate all entries in said associative memory and in which, when the count in said counter reaches a count of one:
   A) said counter is reset to all "1"s; and
   B) all the multi-digit validity count fields in all entries in said associative memory are reset to a count of zero.

12. The computer system of claim 6 in which said counter is negatively incremented to simultaneously invalidate all entries in said associative memory and in which, when the count in said counter reaches a count of one:
   A) said counter is reset to all "1"s; and
   B) all the multi-digit validity count fields in all entries in said associative memory are reset to a count of zero.

13. A computer system including a central processing unit (CPU) and an addressable main memory storing data pages, at least one data page storing a page table, said CPU comprising:
   A) a processor coupled to said main memory;
   B) an associative memory storing a plurality of entries in multiple levels of association, each entry in said associative memory being stored in accordance with a low order virtual address component issued by said processor, each entry in said associative memory including fields respectively holding:
1) a high order virtual address component;
2) a real page address; and
3) a multi-digit validity count;

C) a multi-digit counter storing a current validity count;

D) a comparator for each level of association in said associative memory, each comparator coupled to receive:
1) a high order virtual address component of a requested data page in said main memory from said processor when access to the requested page is desired during the ongoing activity of the CPU;

said processor also sending a low order virtual address component of the requested data page to said associative memory to specify an entry therein at each level of association;
2) the high order virtual address component read from the specified associative memory entry at the comparator's level of association;
3) the multi-digit validity count read from the specified associative memory entry at the comparator's level of association; and
4) the multi-digit current validity count in the counter;

E) a switch for each level of association in said associative memory, each said switch coupled to receive the real page address read from the specified associative memory entry at the switch's level of association and, when enabled, issue the real page address; and F) each said comparator issuing a signal to enable said switch at the same level of association when:
1) there is a match between the high order virtual address components received, respectively, from said processor and said associative memory; and
2) there is a match between the multi-digit validity counts received, respectively, from said counter and said associative memory.

14. The computer system of claim 13 in which, if none of said comparators issues a signal to enable a switch, said processor directs an access to said page table stored in said main memory to obtain the real page address of the requested data page identified by the high order virtual address component sent to said comparators by said processor and the low order virtual address component sent to said associative memory by said processor, thereby obtaining access to said requested data page.

15. The computer system of claim 14 in which said associative memory is updated by placing:
A) the high order virtual address component for the requested data page, as obtained from the page table, into the high order virtual address component field of the least-recently-used entry at the level of association defined by the virtual low order address of the requested data page;
B) the real page address for the requested data page, as obtained from the page table, into the real page address field of said least-recently-used entry; and
C) the current count in said multi-digit counter into the multi-digit validity count field of said least-recently-used entry.

16. The computer system of claim 13 in which all entries in said associative memory are simultaneously invalidated by incrementing said counter.

17. The computer system of claim 14 in which all entries in said associative memory are simultaneously invalidated by incrementing said counter.

18. The computer system of claim 15 in which all entries in said associative memory are simultaneously invalidated by incrementing said counter.

19. The computer system of claim 16 in which said counter is positively incremented to simultaneously invalidate all entries in said associative memory and in which, when the count in said counter reaches all "1"s:
A) said counter is reset to a count of one; and
B) all the multi-digit validity count fields in all entries in said associative memory are reset to a count of zero.

20. The computer system of claim 17 in which said counter is positively incremented to simultaneously invalidate all entries in said associative memory and in which, when the count in said counter reaches all "1"s:
A) said counter is reset to a count of one; and
B) all the multi-digit validity count fields in all entries in said associative memory are reset to a count of zero.

21. The computer system of claim 18 in which said counter is positively incremented to simultaneously invalidate all entries in said associative memory and in which, when the count in said counter reaches all "1"s:
A) said counter is reset to a count of one; and
B) all the multi-digit validity count fields in all entries in said associative memory are reset to a count of zero.

22. The computer system of claim 16 in which said counter is negatively incremented to simultaneously invalidate all entries in said associative memory and in which, when the count in said counter reaches a count of one:
A) said counter is reset to all "1"s; and
B) all the multi-digit validity count fields in all entries in said associative memory are reset to a count of zero.

23. The computer system of claim 17 in which said counter is negatively incremented to simultaneously invalidate all entries in said associative memory and in which, when the count in said counter reaches a count of one:
A) said counter is reset to all "1"s; and
B) all the multi-digit validity count fields in all entries in said associative memory are reset to a count of zero.

24. The computer system of claim 18 in which said counter is negatively incremented to simultaneously invalidate all entries in said associative memory and in which, when the count in said counter reaches a count of one:
A) said counter is reset to all "1"s; and
B) all the multi-digit validity count fields in all entries in said associative memory are reset to a count of zero.

25. A computer system including a central processing unit (CPU) and an addressable main memory storing data pages, at least one data page storing a page table, said CPU comprising:
A) a processor coupled to said main memory;
B) an associative memory storing a plurality of entries, each entry in said associative memory being stored in accordance with a low order virtual address component issued by said processor, each entry in said associative memory including fields respectively holding:
1) a high order virtual address component;
2) a real page address; and
3) a multi-digit validity count;
C) a multi-digit counter storing a current validity count;
D) a comparator coupled to receive:
1) a high order virtual address component of a requested data page in said main memory from said processor when access to the requested page is desired during the ongoing activity of the CPU;

said processor also sending a low order virtual address component of the requested data page to said associative memory to specify an entry therein;
2) the virtual high order address component read from the specified associative memory entry;
3) the multi-digit validity count read from the specified associative memory entry; and
4) the multi-digit current validity count in the counter;

E) a switch coupled to receive the real page address read from the specified associative memory entry and, when enabled, issue the real page address;
F) concatenation means for appending an offset value from said processor to said issued real page address to obtain a main memory block address;
G) said comparator issuing a hit signal to enable said switch when:
  1) there is a match between the high order virtual address components received, respectively, from said processor and said associative memory; and
  2) there is a match between the multi-digit validity counts received, respectively, from said counter and said associative memory;
H) said comparator issuing a miss signal to said processor when at least one of the comparisons between:
  1) the high order virtual address components received, respectively, from said processor and said associative memory; and
  2) the multi-digit validity counts received, respectively, from said counter and said associative memory;
results in a no-match condition;
I) said processor responding to a miss signal received from said comparator by invoking an access to said page table stored in said main memory to obtain the real address of the requested data page identified by the high order virtual address component sent to said comparator by said processor and the low order virtual address component sent to said associative memory by said processor, thereby obtaining access to said requested data page;
J) means for, in the event of a miss and resulting access to said page table, updating the entry specified by the virtual low order address of the requested data page by placing:
  1) the high order virtual address component for the requested data page into the high order virtual address component field;
  2) the real page address for the requested data page into the real page address field; and
  3) the current count in said multi-digit counter into the multi-digit validity count field; and
K) means for selectively incrementing said counter to simultaneously invalidate all entries in said associative memory.

26. A computer system including a central processing unit (CPU) and an addressable main memory storing data pages, at least one data page storing a page table, said CPU comprising:
A) a processor coupled to said main memory;
B) an associative memory storing a plurality of entries in multiple levels of association, each entry in said associative memory being stored in accordance with a low order virtual address component issued by said processor, each entry in said associative memory including fields respectively holding:
  1) a high order virtual address component;
  2) a real page address; and
  3) a multi-digit validity count;
C) a multi-digit counter storing a current validity count;
D) a comparator for each level of association in said associative memory, each said comparator coupled to receive:
  1) a high order virtual address component of a requested data page in said main memory from said processor when access to the requested page is desired during the ongoing activity of the CPU;
said processor also sending a low order virtual address component of the requested data page to said associative memory to specify an entry therein at each level of association;
  2) the virtual high order address component read from the specified associative memory entry at the comparator's level of association;
  3) the multi-digit validity count read from the specified associative memory entry at the comparator's level of association; and
  4) the multi-digit current validity count in the counter;
E) a switch for each level of association in said associative memory, each said switch coupled to receive the real page address read from the specified associative memory entry at the switch's level of association and, when enabled, issue the real page address;
F) each said comparator issuing a hit signal to enable said switch at the same level of association when:
  1) there is a match between the high order virtual address components received, respectively, from said processor and said associative memory; and
  2) there is a match between the multi-digit validity counts received, respectively, from said counter and said associative memory;
G) concatenation means for appending an offset value from said processor to said issued real page address to obtain a main memory block address;
H) each said comparator issuing a miss signal to said processor when at least one of the comparisons between:
  1) the high order virtual address components received, respectively, from said processor and said associative memory; and
  2) the multi-digit validity counts received, respectively, from said counter and said associative memory;
results in a no-match condition;
I) said processor responding to miss signals issued by all said comparators by invoking an access to said page table stored in said main memory to obtain the real page address of the requested data page identified by the high order virtual address component sent to said comparators by said processor and the low order virtual address component sent to said associative memory by said processor, thereby obtaining access to said requested data page;
J) means for, in the event of a miss signal issued by all said comparators and resulting access to said page table, updating the entry specified by the virtual low order address of the requested data page by placing:
  1) the high order virtual address component for the requested data page, as obtained from the page table, into the high order virtual address component field of the least-recently-used entry at the level of association defined by the virtual low order address of the requested data page;
  2) the real page address for the requested data page, as obtained from the page table, into the real page address field of said least-recently-used entry defined by the virtual low order address of the requested data page; and
  3) the current count in said multi-digit counter into the multi-digit validity count field of said least-recently-used entry defined by the virtual low order address of the requested data page; and
K) means for selectively incrementing said counter to simultaneously invalidate all entries in said associative memory.

* * * * *